(12) United States Patent
Mojeski

(10) Patent No.: US 9,085,313 B2
(45) Date of Patent: Jul. 21, 2015

(54) APPARATUS AND METHOD FOR MOVING LARGE AND/OR HEAVY OBJECTS

(71) Applicant: Robert Mojeski, Sag Harbor, NY (US)

(72) Inventor: Robert Mojeski, Sag Harbor, NY (US)

(73) Assignee: MARDERS INVENTIONS, LLC, Bridgehampton, NY (US)

( * ) Notice: Subject to any disclaimer, the term of this patent is extended or adjusted under 35 U.S.C. 154(b) by 0 days.

(21) Appl. No.: 13/892,741

(22) Filed: May 13, 2013

(65) Prior Publication Data

US 2014/0333041 A1 Nov. 13, 2014

(51) Int. Cl.
*B62B 1/00* (2006.01)
*B62B 3/10* (2006.01)

(52) U.S. Cl.
CPC .......................................... *B62B 3/10* (2013.01)

(58) Field of Classification Search
CPC ........ B62B 1/00; B62B 3/02; B62B 2301/08; B62B 1/08; B62B 2206/00
USPC ........ 280/79.2, 79.3, 79.6, 79.11, 651, 47.34, 280/47.18, 47.2, 47.12, 47.19, 47.28, 79.7
See application file for complete search history.

(56) References Cited

U.S. PATENT DOCUMENTS

| | | | | |
|---|---|---|---|---|
| 1,358,235 A * | 11/1920 | Nylin | ......................... | 280/47.34 |
| 1,424,741 A * | 8/1922 | Ahope | ......................... | 280/79.3 |
| 1,866,887 A * | 7/1932 | Gleason et al. | ............ | 280/47.12 |
| 2,258,289 A | 10/1941 | Jeffrey | | |
| 3,156,313 A | 11/1964 | Peterson | | |
| 4,135,592 A | 1/1979 | Wincent | | |
| 4,653,765 A * | 3/1987 | Smalley et al. | ............ | 280/47.2 |
| 4,708,577 A | 11/1987 | Fratzke | | |
| 5,048,206 A * | 9/1991 | Jones | ............................ | 280/651 |
| 5,496,143 A * | 3/1996 | Breyer | ............................ | 414/23 |
| 5,813,680 A * | 9/1998 | Shaw et al. | ................. | 280/47.26 |
| 5,931,483 A * | 8/1999 | Haynes | ...................... | 280/47.19 |
| 6,086,310 A * | 7/2000 | Lujan et al. | ................. | 280/47.2 |
| 6,971,654 B2 * | 12/2005 | Amsili | ......................... | 280/47.2 |
| 7,210,590 B2 * | 5/2007 | Labrecque et al. | ........... | 212/301 |
| 7,278,645 B1 * | 10/2007 | Davis | ......................... | 280/47.28 |
| 7,597,522 B2 | 10/2009 | Borntrager et al. | | |
| 8,651,500 B2 * | 2/2014 | Mitchell et al. | ............ | 280/47.18 |
| 2003/0127258 A1 | 7/2003 | Lansberry | | |

* cited by examiner

*Primary Examiner* — Hau Phan
(74) *Attorney, Agent, or Firm* — Marvin Petry; Stites & Harbison PLLC

(57) ABSTRACT

A wheeled cart and a method for moving large and/or heavy objects along the ground which comprises a pair of main wheels mounted on an axle, a pair of side frames located between the main wheels and an open front basket mounted between and fixedly connected to the side frames. The object is loaded onto a support plate of the basket. The support plate is then raised by a power unit after which the basket can be rotated upwardly and rearwardly about the axle so as to place the weight of the object closer to or over the axle. A power source is provided for lifting the support plate and for driving the wheeled cart, both forwardly and rearwardly.

15 Claims, 8 Drawing Sheets

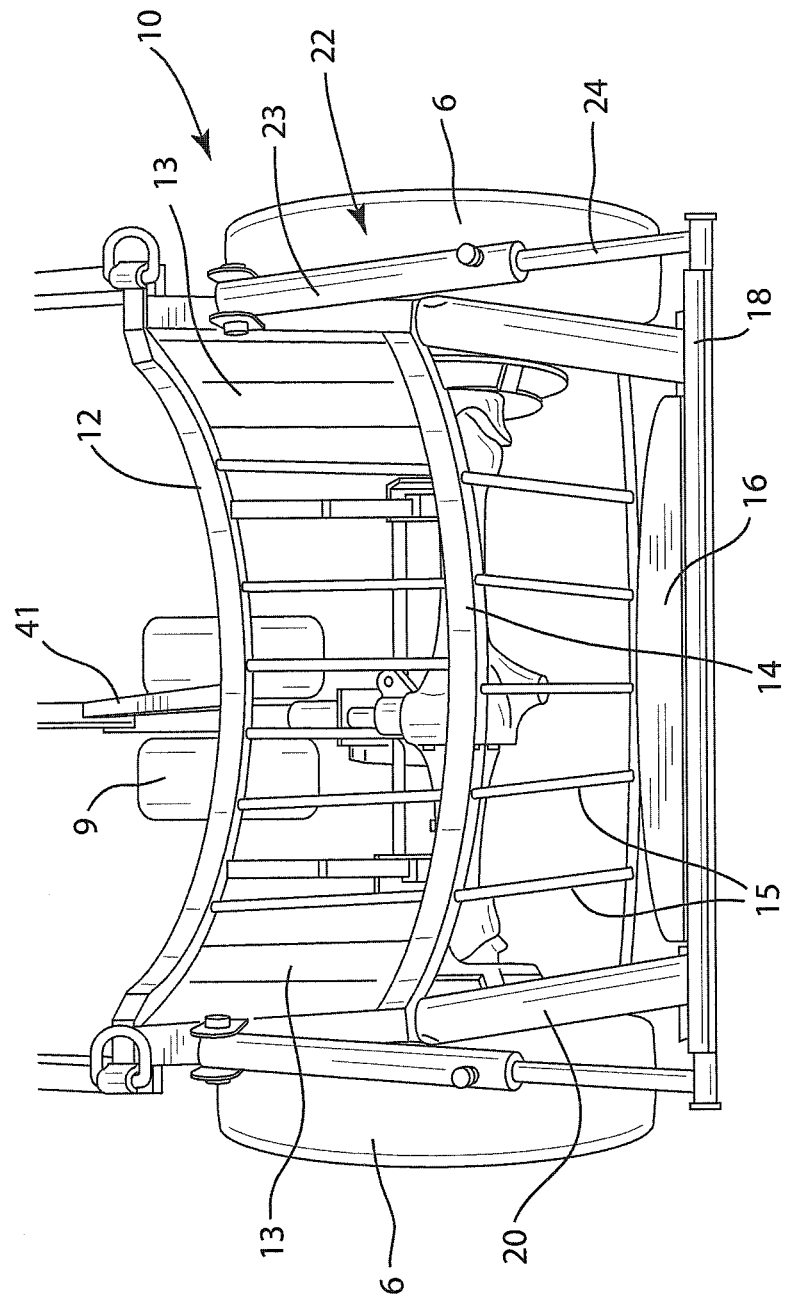

APPARATUS AND METHOD FOR MOVING LARGE AND/OR HEAVY OBJECTS

FIELD OF THE INVENTION

The present invention relates to an apparatus and a method to facilitate moving large and/or heavy objects along a surface.

BACKGROUND OF THE INVENTION

It is frequently necessary to move a very large and/or heavy object such as a tree with a large rootball, after it has been removed from the ground. The same need arises with respect to moving other heavy objects such as rocks along the ground from one location to another, for example from its original location to another location in the same general area or to a location where it can be mounted on a vehicle for transport to a distant location.

Apparatus and methods for effecting movement of such objects are now relatively limited. Usually, for objects which are too large and/or heavy to be carried by a person, but not extraordinarily large or heavy, a hand cart is used. However, it is often difficult to load such an object onto a hand cart. Also, once the object is loaded onto the hand cart, the weight of the object makes it difficult to move the hand cart and object along the ground.

If the large object is a rock, movement can be accomplished by using heavy equipment such as a front-end loader or a skid-steer. However, skid-steers are relatively heavy and expensive and the plate of the skid-steer would tend to damage the ground. If the large object is a tree, then it would be necessary to use heavy equipment in the form of a tree excavator and transplanter, an example of which is shown in U.S. Pat. No. 6,530,333. U.S. Pat. No. 2,258,289 shows an apparatus in the form of a trailer attachable to a vehicle for transporting a tree a long distance. However, this patent does not describe how the tree is moved along the ground to the trailer, and its purpose is essentially to turn a tree from a mounted horizontal position to a mounted position tilted upwardly to facilitate long distance travel of the tree.

Thus, there exists a need for improvements in an apparatus and method for loading a large and/or heavy object at one location and moving it over the ground to another location where it can be easily unloaded onto the ground or onto a vehicle.

SUMMARY OF THE INVENTION

According to the present invention, there is provided a wheeled cart having a pair of main wheels mounted on an axle. A main frame is also mounted on the axle, between the main wheels and includes side frames which extend from a front part forward of the main wheels upwardly and then rearwardly to a rear part. Mounted to and located between the side frames is an open front basket, onto which a heavy object such as a rock or the rootball of a tree is loaded.

Connected to the main frame, rearwardly of the main wheels is a dolly brace connected at its bottom to one or more dolly wheels. The open basked is fixedly connected to the dolly brace. In operation, with the basket in a forward position, a support plate is close to ground level for convenient loading of the heavy object into the basket. A piston and cylinder power unit connected at one end to the support plate and at its other end to legs fixedly attached to the basket is then retracted to lift the support plate and hence the large and/or heavy object so as to locate the center of gravity of the object closer to a vertical line extending upwardly from the axle of the main wheels. After the support plate and object are thus lifted, the entire main frame with the basket is then manually rotated about the wheel axle to a rearward position such that the rear part of the main frame moves downwardly, pivoting about the axle, until the dolly wheel or wheels engage the ground. In this position the center of gravity of the object is even closer to a vertical line through the axle. Consequently, the wheeled cart can more easily be moved along the ground to transport the object from one location to another.

When at the new location, the operation is reversed, rotating the main frame forwardly about the axle, causing the rear part of the frame to rise up, carrying with it the dolly brace and dolly wheels, as the main frame and basket pivot forwardly and downwardly until the feet on the legs engage the ground. The support plate is then further lowered by the piston and cylinder power unit, placing it at or below ground level so that the object can be placed onto the ground or in a large hole in the ground.

Although the advantages of the present invention can be achieved by manually operating the cart, in practice it is preferable to include a power source for operating the hydraulic piston and cylinder power unit and for moving the wheeled cart along the ground. For this purpose, the wheeled cart is preferably provided with an engine, such as a small gasoline engine, and a hydraulic pump which, through appropriate fluid lines, drives the cart forward and in reverse and operates the hydraulic piston and cylinder power unit. The power source, including the engine and hydraulic pump are preferably mounted on a platform on a gimbal assembly so that the power source is always disposed horizontally, parallel to the ground.

Thus, it is an object of the present invention to provide a new and improved method and apparatus for moving a large and/or heavy object along the ground from one location to another.

It is another object of the present invention to provide such an improved apparatus and method wherein there is provided on the apparatus itself a power source so as to operate the apparatus.

It is another object of the present invention to provide an apparatus for moving such an object which comprises a vehicle having main wheels on an axle and a front open basket which is pivotable about the wheel axle for raising and lowering the front basket.

It is another object of the present invention to provide a cart having wheels and an open front basket mounted for pivotable movement about the wheel axle and which includes a power source for moving the wheeled cart along the ground.

These and other objects of the present invention will be made apparent by the detailed description which follows.

BRIEF DESCRIPTION OF THE FIGURES

There follows a detailed description of the preferred embodiments together with the accompanying drawings wherein:

FIG. 8 is a partial front elevational view of FIG. 6.

DETAILED DESCRIPTION OF THE PREFERRED EMBODIMENTS

There follows a detailed description of preferred embodiments, wherein like elements are represented by like numerals throughout the several views.

Figure 4:
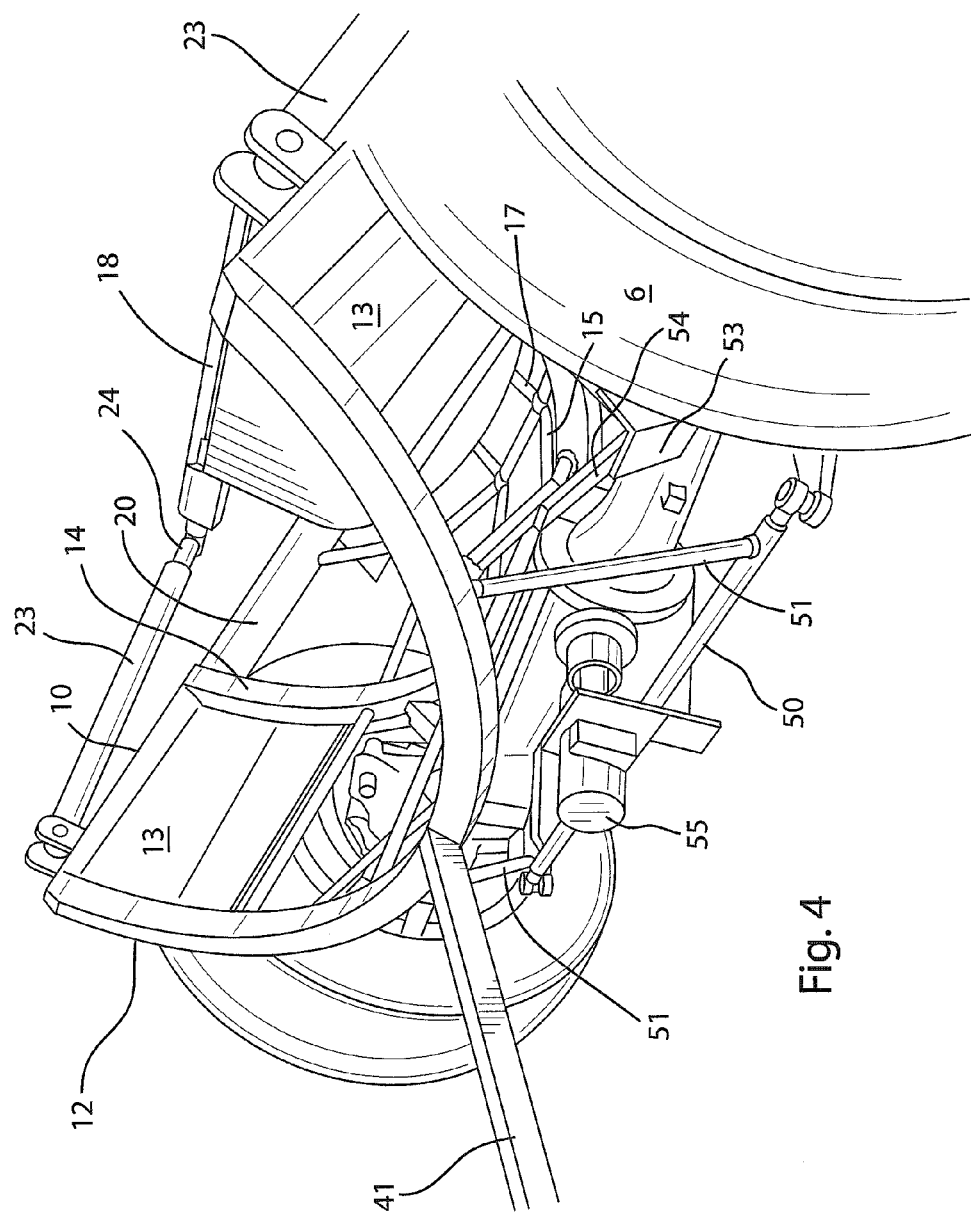
FIG. 4 is a partial enlarge view of the basket of FIGS. 1-3 shown from the rear side thereof.
Figure 5:
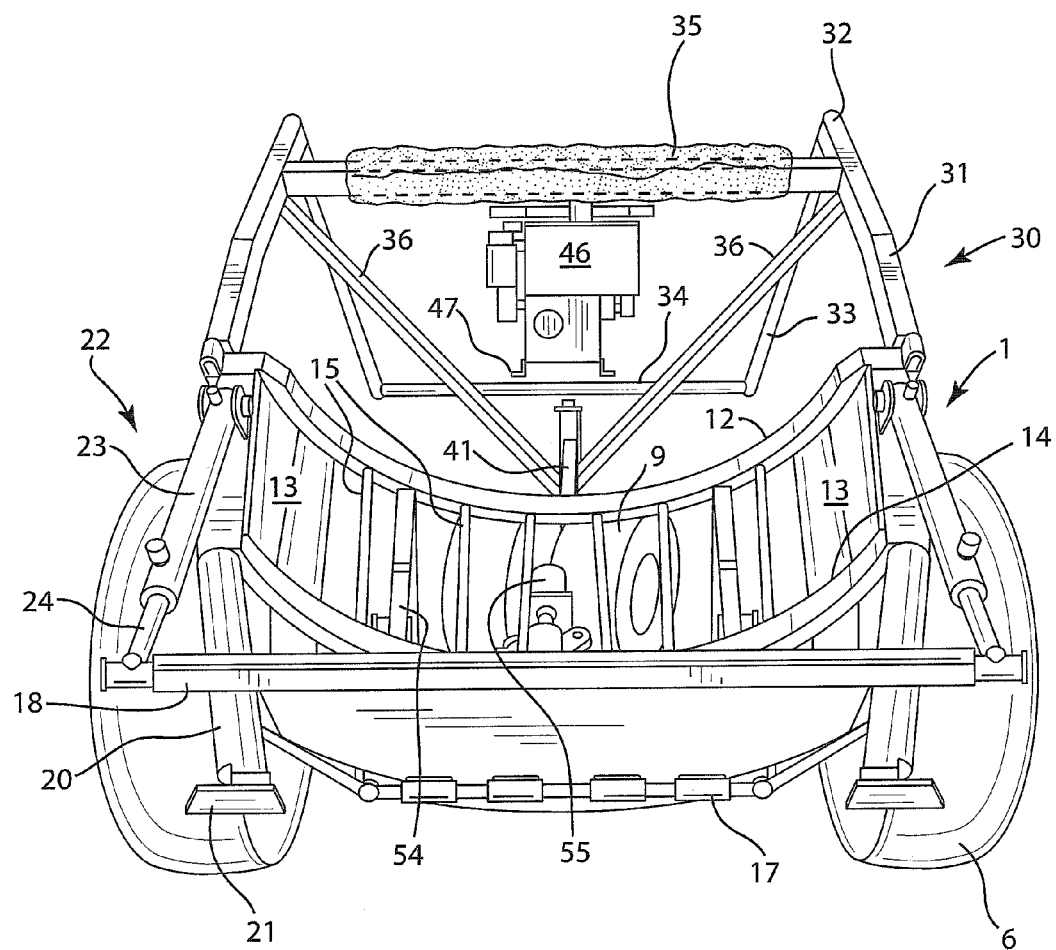
FIG. 5 is a front elevational view of FIG. 1 without an object in the basket.
Figure 6:
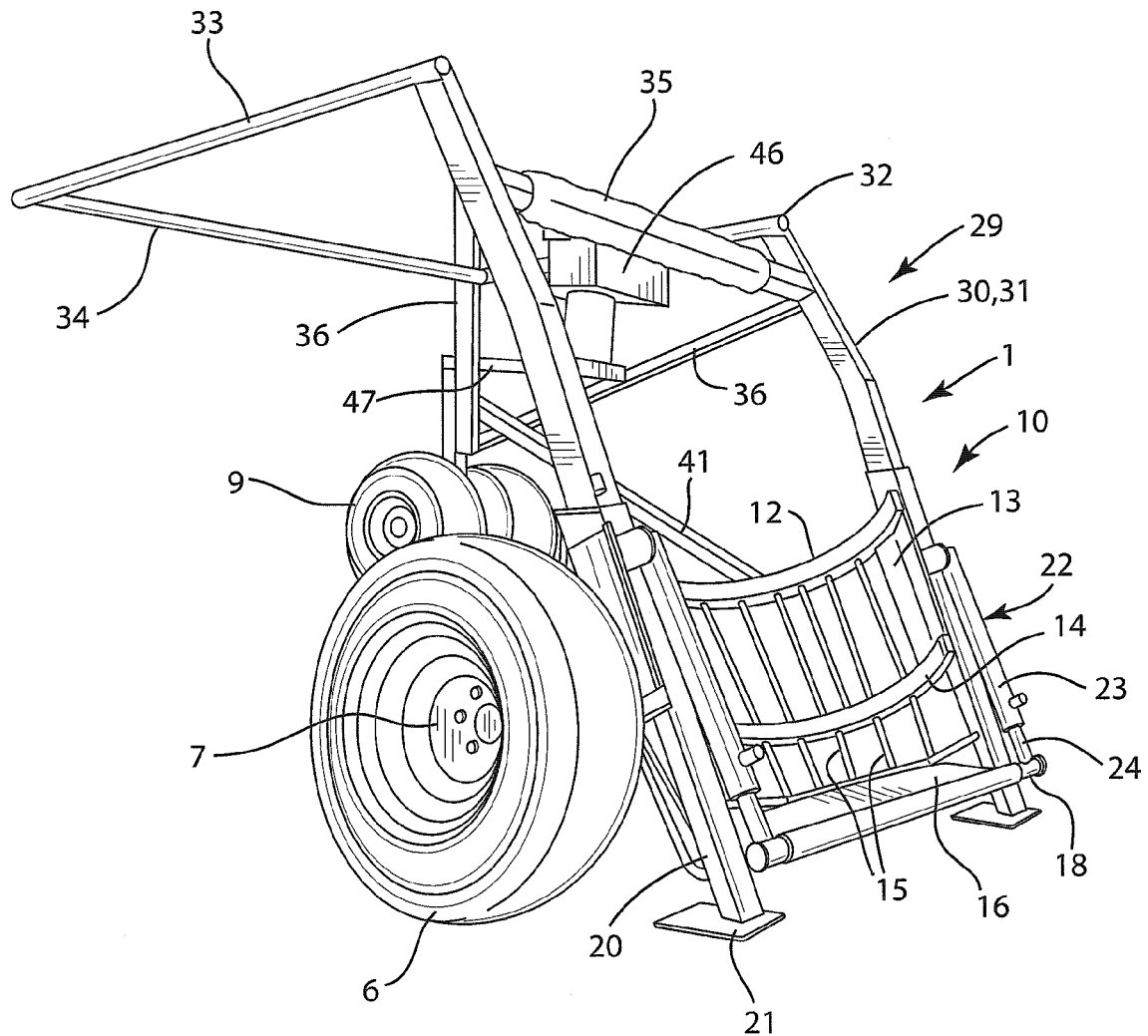
FIG. 6 is a side elevational view similar to FIG. 1 but in a forward position and without an object in the basket.
Figure 7:
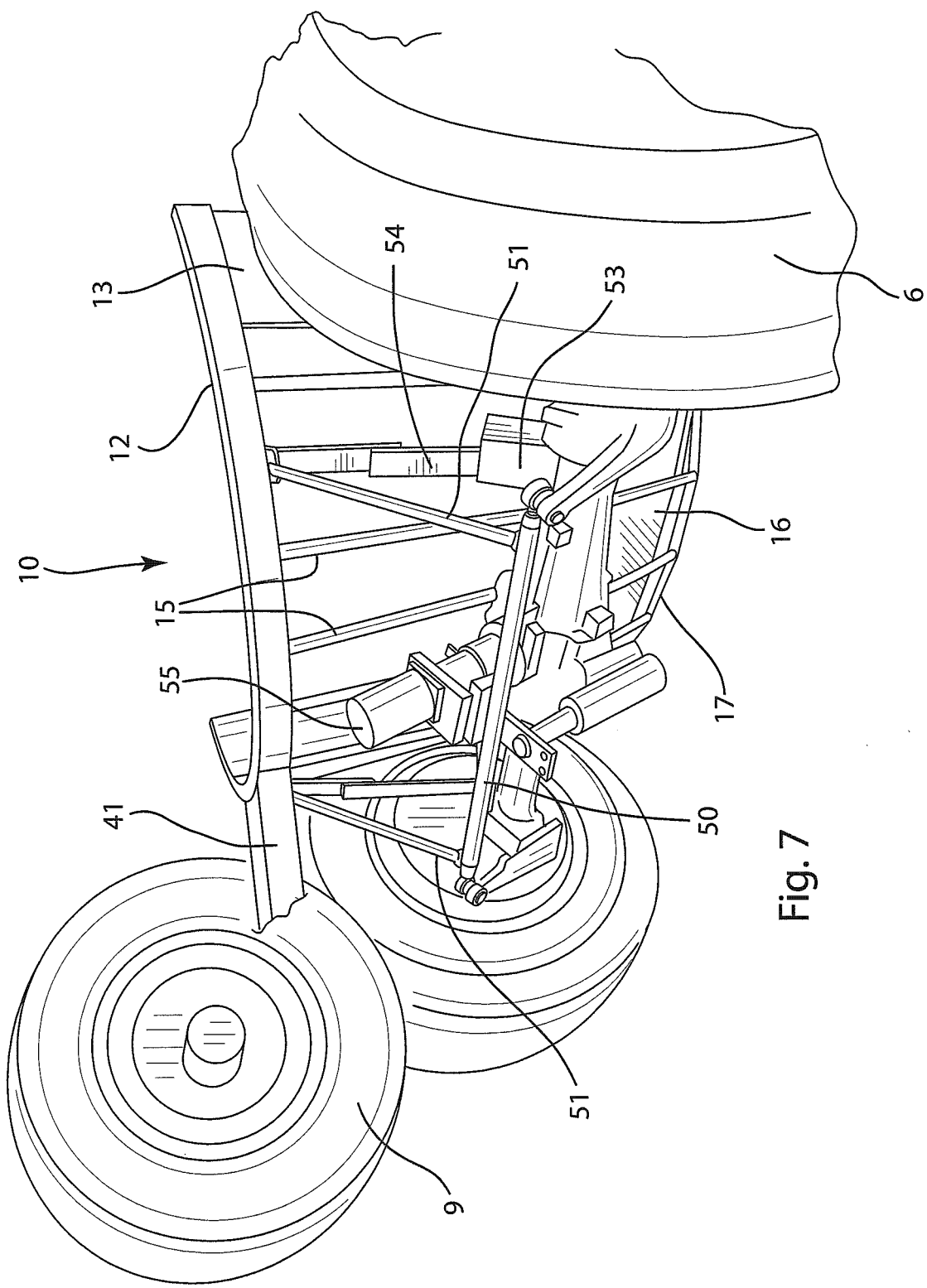
FIG. 7 is a partial rear elevational view of FIG. 6.

The wheeled cart 1 of the present invention is movable between a rearward position, with the basket 10 raised and the dolly wheels 9 on the ground, as shown in FIGS. 1-5, and a forward position with the basket 10 in its forward lowered position as shown in FIGS. 6-8.

As best shown in FIGS. 4, 5 and 8, the wheeled cart 1 comprises an open front basket 10 which has a curved back comprising an upper rim 12, side plates 13, a central horizontal frame 14 and spindle rods 15. The bottom of the basket is formed by a support plate 16. The elements 12-15 are integrally connected together to form a basket open at the front. The spindles 15 may also be referred to as upright back. The lower end of the spindle rods 15 are pivotally connected at a hinge 17 to the back of the support plate 16. The front end of the support plate 16 is pivotally mounted on a front crossbar 18.

Figure 1:
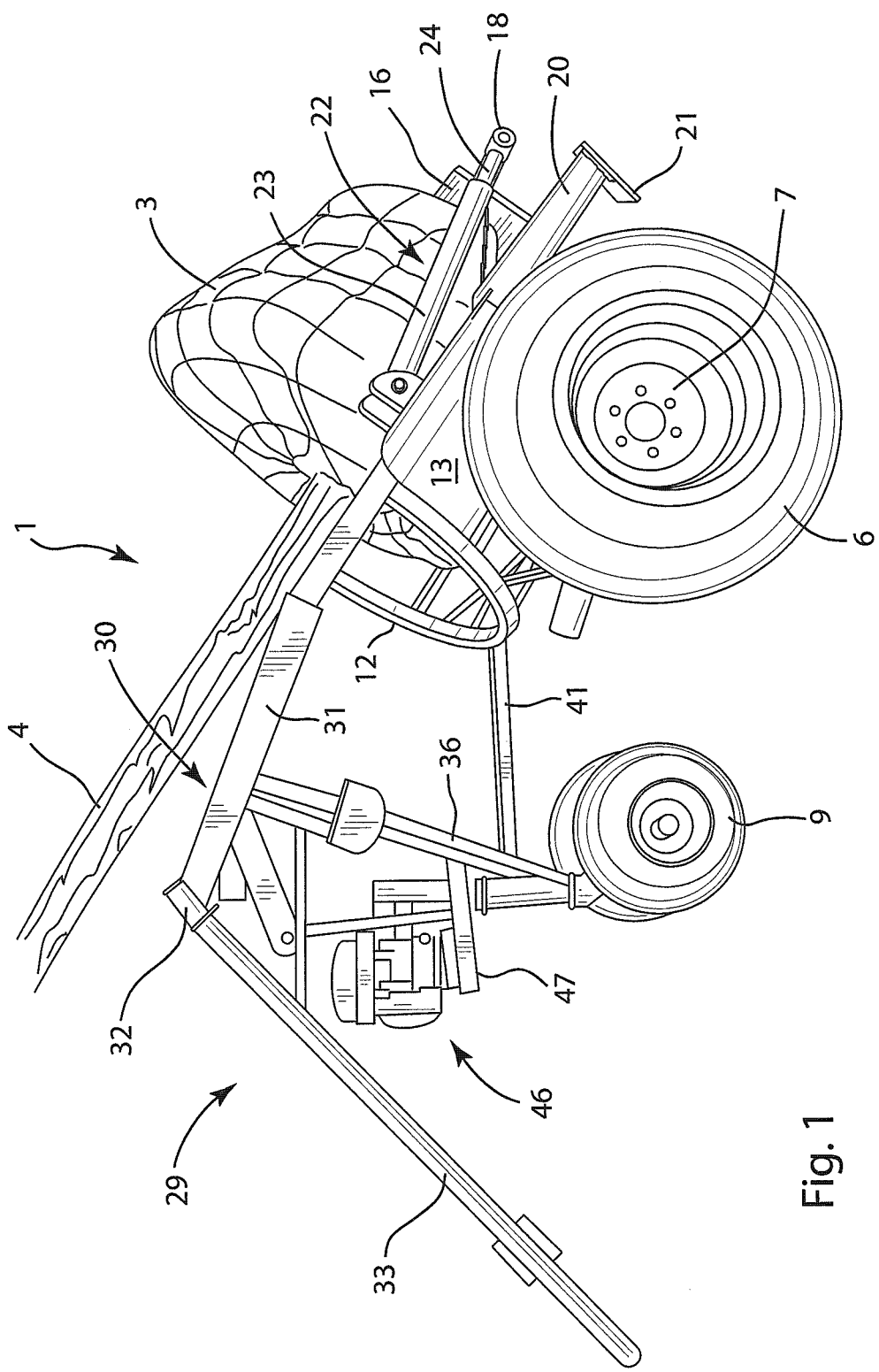
FIG. 1 is a side elevational view of a wheeled cart according to the present invention, in the rearward position.
Figure 2:
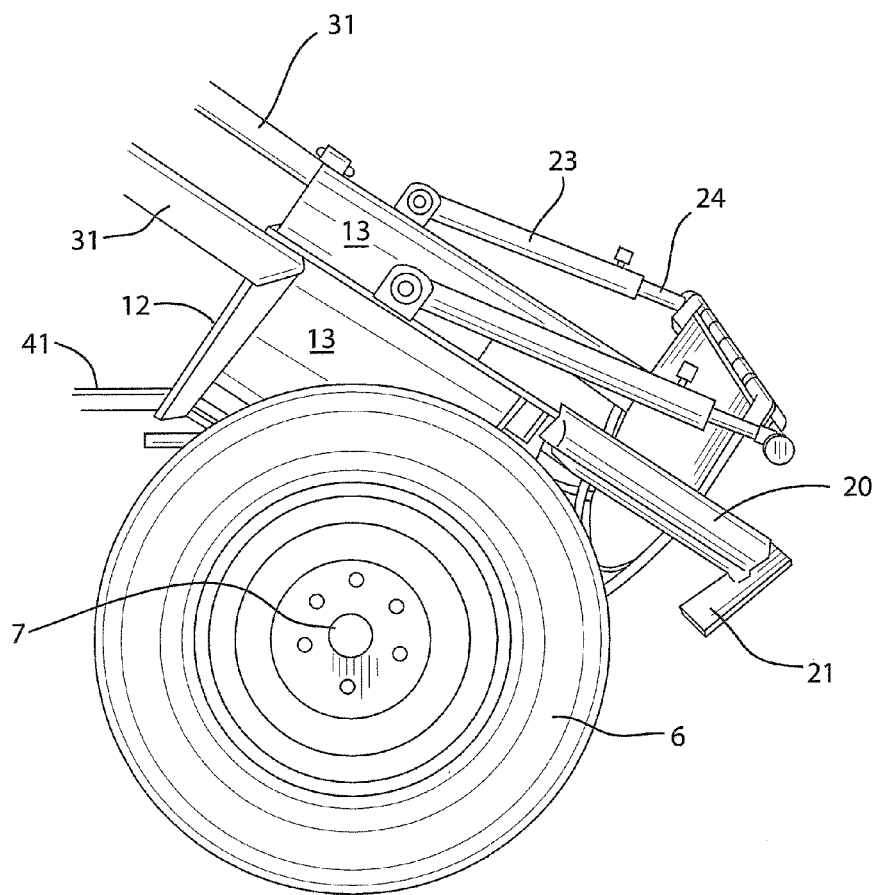
FIG. 2 is a partial side elevation view similar to FIG. 1 but shown without an object in the basket.
Figure 3:
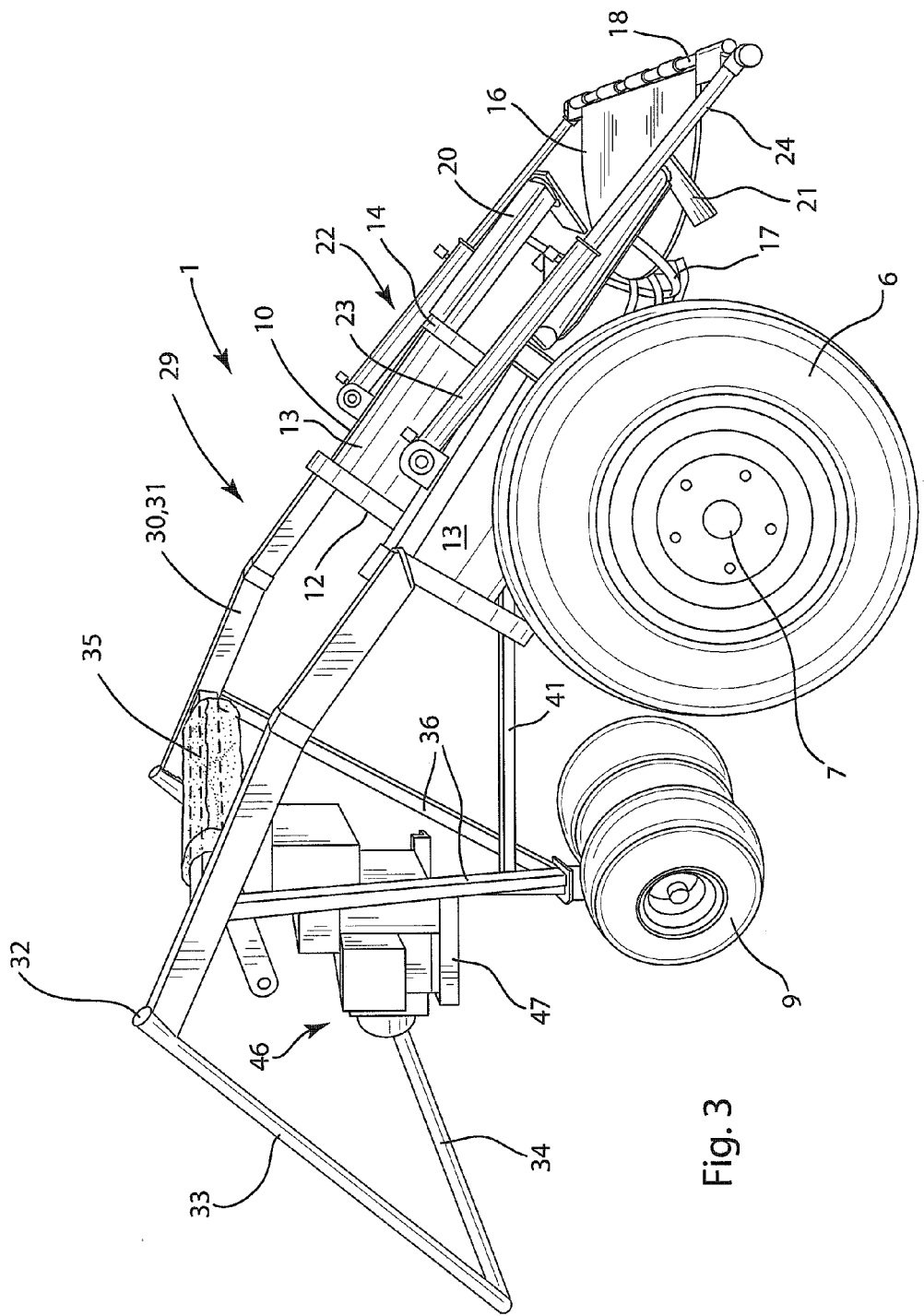
FIG. 3 is a side elevational view similar to FIG. 1 but without an object in the basket and with the support plate in a lowered position.

The side plates 13 of the basket are rigidly connected to legs 20 which extend downwardly to feet 21. Hydraulic power units 22 comprise cylinders 23 which are pivotally connected to the legs 20. The hydraulic cylinders 23 act on pistons connected to piston rods 24 which at their lower ends engage the front crossbar 18. The purpose of the hydraulic cylinders and pistons 23 and 24 is to lift and lower the front of the support plate 16 by pivoting same about hinge 17 from a lifted position as shown in FIGS. 1, 2 and 5 to a lowered position as shown in FIGS. 3 and 8.

Fixedly attached to the sides of the basket 10 is a main frame 29 having side frames 30, each having a front part 31 extending upwardly to an apex 32 and downwardly and rearwardly, forming a rear part 33, wherein the two side frames are connected by a handlebar 34 and a crossbar 35, the latter of which has a soft material wrapped around same to facilitate engagement with a tree trunk.

The dolly wheels 9 are connected to a V-shaped brace 40 which at its upper outer ends engages the side frames 30. The upper rim 12 of the basket 10 is connected to the base of the v-shaped brace 36 by a bar 41.

Referring to FIG. 7, a bracket 53 fixed to the axle 7 has a strut 54 connected thereto and rigid with the upper rim 14 of the basket. This braces the basket 10 as the basket is rotated about the axle 7. The basket is further connected to the axle 7 by struts 51 which engage a stabilizing crossbar 50 so that when the basket 10 is pivoted upwardly and rearwardly, the basket 10 will pivot over a wide arch so as to stay clear of the ground. The structure 53 includes an angled strut 54 which enables the basket 10 to be rotated about the axle 7 when the entire main frame 29 is rotated rearwardly up and about the axle 7.

Referring initially to FIGS. 6-8, the wheeled cart 1, which is in its forward position, can have a large object such as a tree or rock loaded thereon. To accomplish this, the support plate 16 would first be lowered to the ground as shown in FIGS. 3 and 8 by expanding the piston rods 24 out of the cylinders 23. The support plate 16 is then lifted by retraction of piston rods 24 to the position as shown in FIG. 6. In this raised position of the support plate 16, the center of gravity of the load has been lifted far enough upwardly and closer to a vertical line through the axle 7 that an operator has sufficient leverage by grasping the handlebar 34 to pull the handlebar and dolly wheels 9 downwardly to touch the ground. In this position it is relatively easy to steer the wheeled cart along the ground.

When the cart has reached its new destination, to remove the large object, the handlebar 34 is first raised to lift the dolly wheels 9 above the ground so that the cart moves to the position as shown in FIGS. 6-8. The operator would then extend the piston rods 24 to lower the support plate down to be level with the ground. The load, such as a tree, would then be in a vertical position for removal from the wheeled cart.

The wheeled cart is provided with a power source 46 in the form of an engine and a hydraulic pump, which unit is mounted on a platform 47 connected to the dolly brace 36. The power source would be mounted on a gimbal so as to assure its horizontal orientation throughout all the different operating positions of the wheeled cart.

The power unit, in addition to operating the piston rod 24 and cylinders 23 to lift and lower the open basket also provides power for turning the main wheels 6, both forwardly and rearwardly by means of power hoses, not shown connected to power unit 55. The wheels are mounted on a differential axle.

The invention also comprises a method of moving a large object over a surface wherein the large object is placed on a support plate of an open front basket located on a wheeled cart, wherein the basket is pivotally mounted to move the weight of the object over the axle of the wheeled cart, by lifting and rotating the basket.

Although the invention has been described above with respect to preferred embodiments, it will be understood by those skilled in the art that modifications and variations are contemplated within the spirit and scope of the invention.

The invention claimed is:

1. A wheeled cart for moving a large object along the ground, comprising:
   a pair of main wheels mounted on an axle,
   a main frame comprising a pair of side frames mounted on the axle and extending from a front location, forward of the axle, upwardly and rearwardly to a rear location located rearwardly of the axle,
   an open front basket mounted between and fixedly connected to the side frames and to the axle, the basket having a vertically extending upright back located rearward of the open front and the upright back of the basket having a lower end directly connected a support plate,
   a dolly wheel assembly comprising a dolly wheel located rearward of the main wheels and a dolly brace connecting the dolly wheels to the main frame rearwardly of the main wheels and forward of the rearward location of the side frames,
   the open basket being fixedly connected to the dolly brace, and
   wherein the frame and basket are mounted to be rotated together between a forward position, wherein the basket and support plate are at a forward position with the support plate near or touching the ground and the dolly wheel is off of the ground, and a rearward position wherein the basket and support plate are raised and turned about said axle, and the dolly wheel engages the ground.

2. A wheeled cart according to claim 1, including a strut assembly connecting the basket to the axle, such that as the basket is rotated about the axle, it is lifted upwardly.

3. A wheeled cart according to claim 1, including a power unit operatively connected between the support plate and the side frames to pivot the support plate about its hinged connection to the basket.

4. A wheeled cart according to claim 3, wherein the power unit comprises a hydraulic piston and cylinder.

5. A wheeled cart according to claim 4, wherein when the basket is in its forward position and the piston and cylinder are extended, the support plate is level with the ground.

6. A wheeled cart according to claim 4, including a power source which comprises an engine and a hydraulic pump mounted on the cart and supplying hydraulic fluid to the piston and cylinder.

7. A wheeled cart according to claim 6, wherein the power source is mounted on a gimbal assembly on the cart so that it is always disposed horizontal to the ground.

8. A wheeled cart according to claim 6, wherein the power source is operatively connected to the main wheels to drive the cart along the ground.

9. A wheeled cart according to claim 1, wherein when the basket is in its rearward position, the dolly wheel which engages the ground assists in steering the cart.

10. A wheeled cart according to claim 1, wherein the basket has a pair of legs on each side thereof which are fixed to the side frames and which extend downwardly with feet which engage the ground when the basket is in its forward position.

11. A wheeled cart according to claim 1, wherein in the rearward position of the basket the center of gravity of the large object is shifted closer to or over the axle, thereby facilitating movement of the wheeled cart and object along the ground.

12. A wheeled cart according to claim 1, including a power unit operatively connected between the support plate and the side frames to pivot the support plate about its hinged connection to the basket, and wherein a front of the support plate is hingedly connected to a crossbar, and the piston is operatively connected to the crossbar.

13. A wheeled cart according to claim 1, wherein the support plate is pivotable about its hinged connection to the basket.

14. A wheeled cart for moving a large object along the ground, comprising:
   a pair of main wheels mounted on an axle,
   a main frame comprising a pair of side frames mounted on the axle and extending from a front location, forward of the axle, upwardly and rearwardly to a rear location located rearwardly of the axle,
   an open front basket mounted between and fixedly connected to the side frames and to the axle, the basket having an upright back located rearward of the open front, and the back being connected near its bottom to the rear of a support plate,
   a dolly wheel assembly comprising a dolly wheel located rearward of the main wheels and a dolly brace connecting the dolly wheels to the main from rearwardly of the main wheels and forward of the rearward location of the side frames,
   the open basket being fixedly connected to the dolly brace,
   wherein the frame and basket are mounted to be rotated together between a forward position, wherein the basket and support plate are at a forward position with the support plate near or touching the ground and the dolly when is off of the ground, and a rearward position wherein the basket and support plate are raised and turned about said axle, and the dolly wheel engages the ground, and
   including a power unit operatively connected between the support plate and the side frames to pivot the support plate about its hinged connection to the basket.

15. A wheeled cart for moving a large object along the ground, comprising:
   a pair of main wheels mounted on an axle,
   a main frame comprising a pair of side frames mounted on the axle and extending from a front location, forward of the axle, upwardly and rearwardly to a rear location located rearwardly of the axle,
   an open front basket mounted between and fixedly connected the side frames and to the axle, the basket having an upright back located rearward of the open front, and the back being connected near its bottom to the rear of a support plate,
   a dolly wheel assembly comprising a dolly wheel located rearward of the main wheels and a dolly brace connecting the dolly wheels to the main frame rearwardly of the main wheels and forward of the rearward location of the side frames,
   the open basket being fixedly connected to the dolly brace,
   wherein the frame and basket are mounted to be rotated together between a forward position, wherein the basket and support plate are at a forward position with the support plate near or touching the ground and the dolly wheel is off of the ground, and a rearward position wherein the basket and support plate are raised and turned about said axle, and the dolly wheel engages, and
   including a power unit operatively connected between the support plate and the side frames to pivot the support plate about its hinged connection to the basket, and wherein a front of the support plate is hingedly connected to a crossbar, and the piston is operatively connected to the crossbar.

* * * * *